United States Patent
Ghosh et al.

(10) Patent No.: US 10,338,796 B2
(45) Date of Patent: Jul. 2, 2019

(54) EVENT SERVICES MODELING FRAMEWORK FOR COMPUTER SYSTEMS

(71) Applicant: SAP SE, Walldorf (DE)

(72) Inventors: Kaushik Ghosh, Santa Clara, CA (US); Abhijit Salvi, Cupertino, CA (US); Kevin Tully, San Francisco, CA (US); Anant Agarwal, San Francisco, CA (US); Alexander Chernavin, Belmont, CA (US); Mirza Raza, Dublin, CA (US); David Ragones, Piedmont, CA (US); Sergei Ponomarev, Cupertino, CA (US)

(73) Assignee: SAP SE, Walldorf (DE)

( * ) Notice: Subject to any disclaimer, the term of this patent is extended or adjusted under 35 U.S.C. 154(b) by 352 days.

(21) Appl. No.: 15/221,423

(22) Filed: Jul. 27, 2016

(65) Prior Publication Data
US 2018/0032241 A1   Feb. 1, 2018

(51) Int. Cl.
| | | |
|---|---|---|
| G06F 9/54 | (2006.01) | |
| G06F 3/0484 | (2013.01) | |
| G06F 3/0481 | (2013.01) | |
| G06F 3/0482 | (2013.01) | |

(52) U.S. Cl.
CPC ........ *G06F 3/04847* (2013.01); *G06F 3/0481* (2013.01); *G06F 3/0482* (2013.01); *G06F 9/542* (2013.01)

(58) Field of Classification Search
CPC combination set(s) only.
See application file for complete search history.

(56) References Cited

U.S. PATENT DOCUMENTS 7,668,953 B1 *   2/2010   Sinclair ................. H04L 41/064
                                              709/224
9,146,962 B1 *   9/2015   Boe ......................... G06F 9/542
(Continued)

OTHER PUBLICATIONS

U.S. Appl. No. 14/984,113, filed Dec. 30, 2015, entitled "Uniform Event Framework," by inventors Baskaran Janarthanam, Dmitri Krakovsky, David ragones, Abhijit Salvi, Abbas Raza, Murali Mazhavanchery, Sirisha Ayyagari, Ankur Bhatt.—Not yet published and not presented herewith.

*Primary Examiner* — Hien L Duong
(74) *Attorney, Agent, or Firm* — Fountainhead Law P.C.

(57) ABSTRACT

Embodiments include an event services modeling framework. The event services modeling framework includes an event services modeling editor that provides a user interface and mechanism for users to model and customize event flow configurations within a system and/or network. The user interface can be used to connect events with actions that will take place in response to the events. The system components and/or modules that need to receive the information from the events can then react and respond appropriately. Users can modify event configurations based on their own particular needs. the event services editor can be used for generating one or more event services models. The event services models may include events, conditions (rules) for processing the events, activities to be perform during event processing, subscriber modules defined for performing the activities during event processing, and a specified time for processing the events in each modeled event flow.

20 Claims, 11 Drawing Sheets

(56) References Cited

U.S. PATENT DOCUMENTS

| | | | |
|---|---|---|---|
| 2006/0161466 A1* | 7/2006 | Trinon | G06F 9/542 |
| | | | 705/7.29 |
| 2008/0086349 A1* | 4/2008 | Petrie | G06Q 10/06 |
| | | | 705/7.11 |
| 2009/0099982 A1* | 4/2009 | Heuler | G06N 5/025 |
| | | | 706/11 |
| 2011/0161397 A1* | 6/2011 | Bekiares | H04L 67/24 |
| | | | 709/203 |
| 2013/0006887 A1* | 1/2013 | Balko | G06Q 10/00 |
| | | | 705/348 |
| 2015/0160797 A1* | 6/2015 | Shearer | G06F 3/0482 |
| | | | 715/740 |
| 2015/0188875 A1* | 7/2015 | Sharp | H04L 51/36 |
| | | | 715/752 |
| 2016/0110374 A1* | 4/2016 | Wetherall | G06F 17/30011 |
| | | | 707/825 |
| 2016/0307228 A1* | 10/2016 | Balasubramanian | G06F 9/542 |
| 2017/0006490 A1* | 1/2017 | Shen | H04L 41/0806 |
| 2017/0068578 A1* | 3/2017 | Janarthanam | G06F 9/542 |
| 2017/0083386 A1* | 3/2017 | Wing | G06F 9/542 |
| 2017/0085445 A1* | 3/2017 | Layman | H04L 43/045 |
| 2017/0228253 A1* | 8/2017 | Layman | G06F 9/485 |
| 2017/0300868 A1* | 10/2017 | Johnson | G06F 17/30336 |
| 2017/0300869 A1* | 10/2017 | Johnson | G06F 17/30362 |
| 2017/0329506 A1* | 11/2017 | Laetham | G06F 3/0482 |

* cited by examiner

Extendable Activity Objects Table 230

| Activity Objects | Activity Attributes/Parameters | | | Extendable Activity Attributes/Parameters | | |
|---|---|---|---|---|---|---|
| Standard Activity Objects | | | | | | |
| | | | | | | |
| | | | | | | |
| Customizable Activity Objects | | | | | | |
| | | | | | | |
| | | | | | | |

231 — Standard Activity Objects
232 — Customizable Activity Objects
233 — Activity Attributes/Parameters
234 — Extendable Activity Attributes/Parameters

FIG. 2A

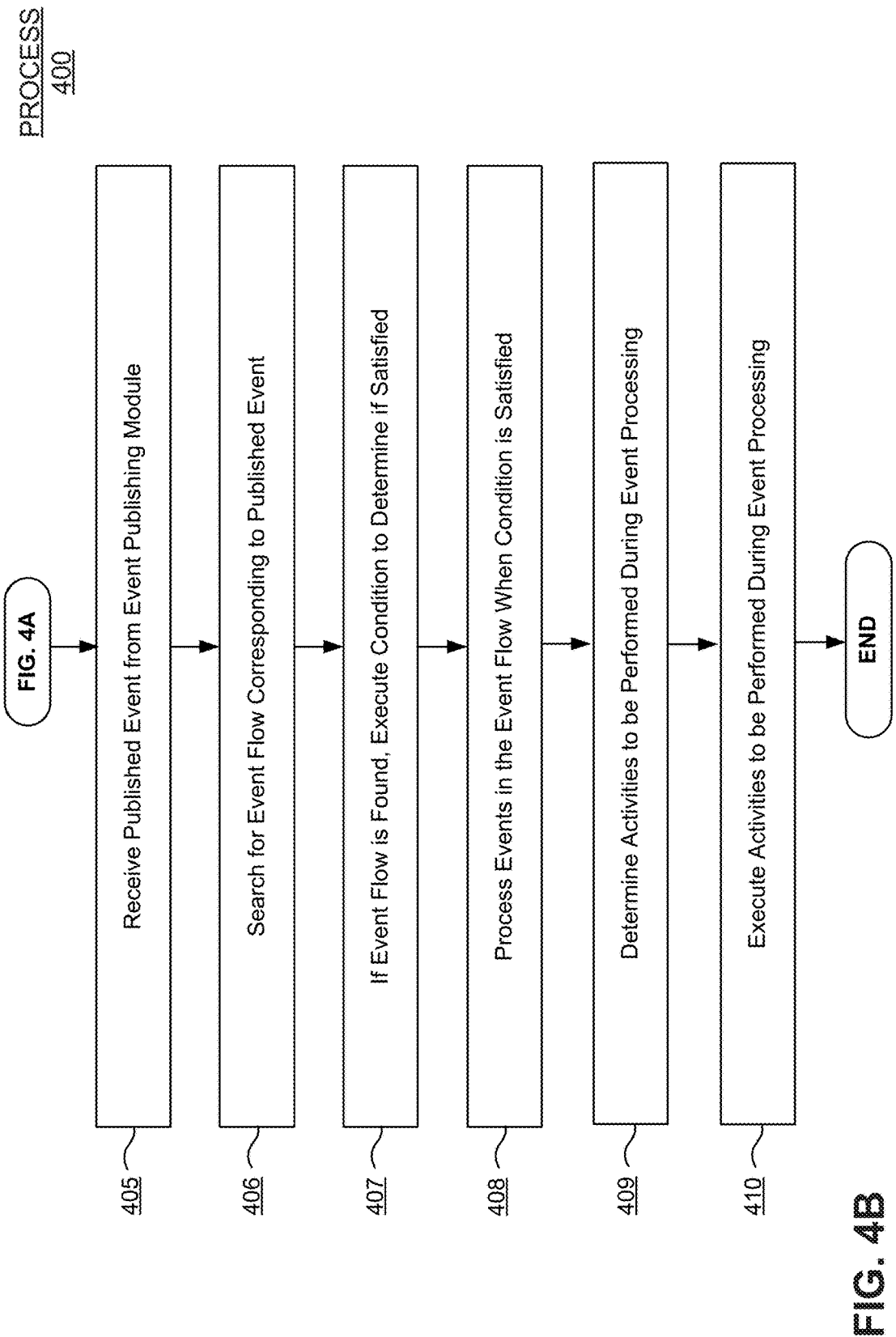

New To Do

701

To Do Title: Enter a title for the to do ...

To Do Message: Enter a description for the to do ...

Link To: Select Module | Select Page of Module
Timing: 2 | Weeks | After Effective Date
Recipients: Select 1 or more recipients Cancel | Save 703 (brace for Title/Message)
704 (brace for Link To/Timing/Recipients)

Existing To Do

702

Review Succession Plan

To Do Title: Review Succession Plan
To Do Message: Now that you have a new direct report, you need to review and confirm your current Succession Plan.
Link To: Succession > Org Chart > Me
Timing: 2 Weeks after effective date
Recipients: Future Manager Close

FIG. 7A

EVENT SERVICES MODELING FRAMEWORK FOR COMPUTER SYSTEMS

CROSS-REFERENCE TO RELATED APPLICATIONS

This patent application is related to co-pending U.S. patent application Ser. No. 14/984,113 entitled "Uniform Event Framework" filed on Dec. 30, 2015, which further claims priority to U.S. Provisional Patent Application No. 62/214,848 filed Sep. 4, 2015, each of which are incorporated herein by reference.

BACKGROUND

Software systems often have many applications and components running on the system. In some instances, the applications and components of the system may constantly generate events throughout the operation of the system. When an application or component generates an event, the application or component may send the event and data associated with the event to one or more interested applications and/or components. In some cases, the application or component sends different data associated with the event to different interested applications and/or components.

Conventional event notification and management services are mostly static configurations within a computer system and/or network. Publishers (publishing modules and/or components) are configured to publish events that arise in the computer system and subscribers (subscribing modules and/or components) are configured to listen for published events and to perform an action or series of actions in response to the published events.

Unfortunately, existing technologies make it difficult for users to visualize an event from end-to-end within a system because, among other things, complex event configurations are not easy to present in an understandable way. In addition, existing technologies do not provide a user interface that enables users/customers to model and customize event configurations within a system in a user-friendly manner.

SUMMARY

The embodiments described in this disclosure relate to improved methods, systems and computer readable media for modeling event services in a computer system and/or network.

The following detailed description and accompanying drawings provide a better understanding of the nature and advantages of the techniques described in this disclosure.

BRIEF DESCRIPTION OF THE DRAWINGS

For a better understanding of at least certain embodiments, reference will be made to the following detailed description, which is to be read in conjunction with the accompanying drawings.

FIG. 2A depicts a conceptual diagram of an example embodiment of an extendable activity objects table in accordance with the techniques described in this disclosure.

FIGS. 4A-4B depict flow charts of an example embodiment of a process for modeling event services in accordance with the techniques described in this disclosure.

FIG. 7A depicts an example embodiment for modeling a To Do event in accordance with the techniques described in this disclosure.

DETAILED DESCRIPTION

Figure 1:
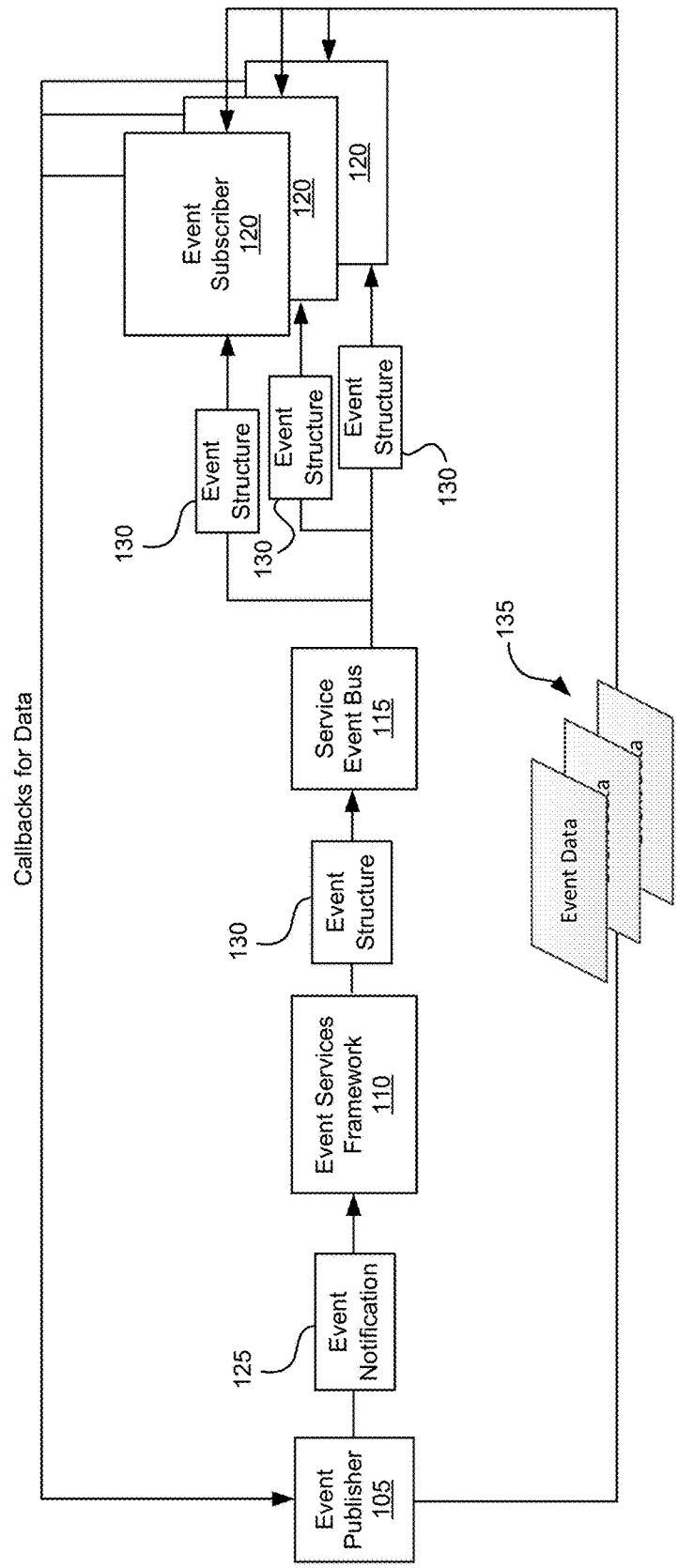
FIG. 1 depicts a conceptual data flow diagram of an example embodiment of a system comprising an event services framework in a static configuration.

Throughout the description, for the purposes of explanation, numerous details are set forth in order to provide a thorough understanding of this disclosure. It will be apparent to one skilled in the art, however, that the techniques described in this disclosure may be practiced without some of these specific details. In other instances, well-known structures and devices may be shown in block diagram form to avoid obscuring the principles and techniques described in this disclosure.

The embodiments described in this disclosure include improved methods, systems and computer readable media for modeling event services in a computer system and/or computer network. In one embodiment, an event services modeling tool, referred to in this disclosure as the "event services editor", can be provided that is configured to enable users to define event services models comprising one or more event flows for events in the system. The event services editor can be implemented in computer hardware, software, and/or combination thereof. In one embodiment, the event services editor is associated with a user interface that can be used to connect events in the computer system and/or network to actions that will take place in response to the events. An event raised in one part of the system can be seamlessly carried over to another part. The system components and/or modules that need to receive the information from the events can then react and respond appropriately.

For example, in response to a "manager change" event within an organization, the new manager and team members may need to receive notifications, the new manager may need to be assigned in the system, new manager learning material may need to be assigned, etc. These actions may reside in separate modules and/or components within a system and/or network. In another example, when an employee is going on leave, a time off request event may be raised in the system. In order to model that event, specific actions in different modules may be necessary to respond to that event.

The event services editor provides a user interface that presents complex event configurations in a user-friendly way that, among other things, enables users to model event services within a system and/or network. For end-to-end event flows, users can configure conditions (rules), set timelines, define notifications, etc. The model can translate into run time behavior for the event. Users can modify event configurations based on their own particular business needs and/or business logic. The model metadata may accommodate the following details: publisher details with publishing conditions, subscriber details with subscriber rules, Business Process Model and Notation ("BPMN") definitions for the activities, To-dos, notifications, and external end point setup.

In one embodiment, instead of hard coding these activities in response to events as in conventional systems, the event services editor designed in accordance with the techniques described in this disclosure can be adapted to provide standard actions to users, who can then customize event flows according to their particular needs. In other cases, event flows can be created and modeled from scratch.

In some embodiments, the models may include modules and/or components that can added, edited and deleted easily. A component may consists of an action or a series of connected actions that can be sequenced. An action may be conditional (pre-requisite to be met or a rule to be evaluated) or delayed (to be executed at some point). In one embodiment, an action may be thought of as performing a business logic need in the response to an event or an action taken after the processing (e.g. notification).

In addition, in at least certain embodiments the event services editor enables navigating across multiple systems and organizational boundaries. The event services editor can be used to create and manage event service flows across internal and third-party applications, modules, and/or components. The event services editor can integrate with internal modules as well as external applications through an event/action configuration, and these configurations can be customizable. For example, a third-party application such as Microsoft 365 calendar, Benefit Focus, Google Docs, etc., can be integrated with the event services editor to receive external events and to respond accordingly. Further, multiple endpoints can be provided for any events raised within a system and/or network.

The event services editor can also facilitate configurations and modeling of new events. The event services framework includes a publishing framework that is configured to publish events upon occurrence of some change within the system. Publishing rules (conditions) can be associated with publishing events. In one embodiment, publisher details may include publishing module name, event name, description, and publishing condition. Depending on how the actions are modeled, subscribers can ensure appropriate actions are called based on the type of action, conditions, timing configured for a particular event flow. In addition, the event services editor can be used to map service interfaces with underlying business systems (like rules engines, business processing engines, etc.) to provide the appropriate event services.

In one embodiment, the event services editor can be used for generating one or more event services models. The event services models can then be stored in a memory of the computer system, a database, and/or other data storage mechanism. In some embodiments an event services model may include (1) one or more events defined for each event flow in the event services model, (2) one or more conditions (rules) for processing the events based on evaluating the conditions, (3) one or more activities to be perform during processing of the events when the condition evaluates to true, (4) one or more subscriber modules defined for performing the activities during processing of the events in the event services model, and (5) a specified time for processing the events in each modeled event flow. In one embodiment, the user interface of the event services editor may be adapted to display a sequence of activities for the events based on the specified time.

In one embodiment, the event services editor may be configured to receive a published event from an event publishing module in communication with the computer system, and then search for a corresponding event flow. A memory of the computer system and/or network, or database (connected or remote), may be searched. If a corresponding event flow is located, the system may be configured to evaluate one or more conditions for the event and execute the conditions to determine if they are satisfied. When the conditions are satisfied, the events in a modeled event flow can be processed. Otherwise, either nothing happens, or in cases where an alternate condition is specified, the event flow corresponding to the alternate condition can be processed.

During event processing, the event services editor may be configured to determine one or more activities to be performed based on the configuration of the event in the event services framework. The activities can then be executed during processing of the events. The activities may be configurable by users in the user interface of the event services editor.

Further, in one embodiment, the event services models may be configurable based on building data structures underneath using the event services framework in accordance with the techniques described in this disclosure. For example, an extendable activity objects table (or other data structure) may be built by the event services editor in response to the user configuration of events in the system. These activity objects may be provided with event services attributes and/or parameters based on the event s services model configuration. Instead of hardcoding the event services configurations, they can be built and stored as objects in the activity objects table, which is discussed in detail below.

An example scenario is as follows: an employee's manager is changed. The employee, his new manager and his old manager receive notification of the change. The employee's new manager is located in U.S. and following takes place based on that location:

(1) In the Learning component, the employee's future manager becomes an alternate manager. A web notification is sent to the manager informing him/her of the subordinate assignment. Notification is sent to the subordinate informing him/her of the alternate manager assignment.

(2) In the Succession Management component, a To-Do is added to the succession planner's to-do list to review the succession plan. Notification is sent to the succession planner to review the employee's succession plan when his manager changes.

(3) In the Calibration component, a notification is sent to a facilitator to review the calibration sessions.

(4) In the Goals Management component, a link to the goal plans for the new team is added to the Home Page. Notifications for the new goals are sent to the employee. The employee's Home Page tile reflects the new manager. The Home Page can also show "Meet Your Team" dossier tile.

(5) In the Onboarding component, notifications are sent to the employee and the hiring manager about re-assigning or restarting of the onboarding activity step.

In another example, the Learning component can consume the "Change in Employee Job Location" and reassign the learning course group based on the new location. The employee is a software engineer working in U.S. and is getting relocated to Germany. The employee needs to complete some courses before he/she moves so that he/she is aware of the cultural and legal issues in the new country. The employee and his manager can also get notifications about the course assignments. Similarly, another employee getting relocated to Singapore can be assigned courses before and after the move and receive the assignment notifications along with his/her manager.

I. Illustrative Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

FIG. 1 depicts a conceptual data flow diagram of an example embodiment of a system comprising an event services framework in a static configuration. As shown, system 100 includes event publisher 105, event services framework 110, service event bus 115, and event subscribers 120. In some embodiments, system 100 may be a human capital management ("HCM") system. System 100 may include a multi-tenant, cloud-based system implemented using a software as a service ("SaaS") technology. It will be apparent to one of ordinary skill in the art upon reading this disclosure that system 100 may incorporate one of any number of different systems (e.g., an enterprise resource planning ("ERP") system, a customer relationship management ("CRM") system, a supply chain management ("SCM") system, a product lifecycle management ("PLM") system, etc.).

The event publisher 105 may be configured to handle publishing of events to the event services framework 110. In some embodiments, the event publisher 105 may be an application, application component, application module, rules engine, etc., operating on system 100. In some such embodiments, event publisher 105 publishes events occurring on event publisher 105. Event publisher 105 may publish events to the event services framework 110 using any number of different methods. For instance, event publisher 105 may publish events based on rules (e.g., business rules) that define the events. In some embodiments, event publisher 105 may publish events based on event definitions.

In some embodiments, an event may be defined as a change in data associated with an application and/or application module. In some embodiments, an event may be defined as a change in the state of an object associated with an application and/or application module. In some embodiments, an event may be defined as a change in an HCM system. Example events in a HCM system may include candidate to onboardee events, onboardee to employee events, change in organization information, change in employee information (e.g., department, division, location, manager, etc.), change in job information (e.g., title, compensation grade, etc.), change in personal information (e.g., name, location, contact information, etc.), spot bonus events, creation of performance improvement plans, creation of global assignments, creation of concurrent jobs, update of public profiles, become manager events, becoming individual contributor events, becoming department head events, initial probation events, contingent to employee events, leave of absence events, suspension/furlough events, short-term disability events, long-term disability events, retirement events, termination events, vacation events, sick day events, performance rating events, potential rating events, nominated potential successor events, risk of loss events, training registration, training completion, creation of training classes, creation of goals, addition of competency, creation of career plans, creation of requisitions, closure of requisitions, submission of applications, assessment of applicants, checking of applicant backgrounds, hiring, creation of interview guides, setting up of interviewers, scheduling of interviews, confirming of interviews, assessment of complete interviews, creation of offers, acceptance of offers, referral of friends for jobs, creation of job alerts, expiration of job alerts, creation of performance management forms, training day events, promotion events, creation of paychecks, etc. In some embodiments, system 100 allows users to define any number of custom events (e.g., an employee moves to a different floor).

As illustrated in FIG. 1, when event publisher 105 publishes an event to event services framework 110, the event publisher 105 sends an event notification 125 to event services framework 110. In some embodiments, the event notification 125 indicates that an event has occurred and does not contain data associated with the event. Event publisher 105 may receive from event subscribers 120 callbacks for data associated with an event published by event publisher 105. In response to a particular callback from an event subscriber 120, the event publisher 105 provides event data 135 (e.g., data associated with the event) requested by the event subscriber 120. In some embodiments, the event publisher 105 provides services for event data 135 (e.g., creating data, updating data, reading data, deleting data, etc.) via a set of application programming interfaces ("APIs"). Examples of APIs include APIs are Open Data Protocol ("OData") APIs, Representational State Transfer ("REST")-based APIs, etc. One of ordinary skill in the art will appreciate that any number of additional and/or different types of APIs may be used in different embodiments.

Event services framework 110 handles providing uniform event structure 130 to service event bus 115 in response to event notification 125. In response to receiving event notification 125 from event publisher 105, event services framework 110 can generate an event structure for the event that occurred on event publisher 105. In some embodiments, event structure 130 includes an event identifier for identifying an event, event publisher identifier for identifying event publisher 105, and pointers to data associated with the event (as opposed to the actual data associated with the event). Event services framework 110 can also perform callbacks to event publisher 105 for information associated with the event in some embodiments. Event services framework 110 may be implemented as a set of libraries in some embodiments.

In at least certain embodiments, the service event bus 115 can be responsible for distributing event structure 130 to event subscribers 120. In different embodiments, service event bus 115 may use any number of different techniques to distribute event structure 130 to event subscribers 120. For example, service event bus 115 may use a set of APIs (e.g., REST-based APIs) provided by a particular event subscriber 120 to send event structure 130 to the particular event subscriber 120. Service event bus 115 may call a function implemented by a particular event subscriber 120 to send event structure 130 to the particular event subscriber 120. Service event bus 115 may be implemented as a set of libraries in some embodiments.

Event subscribers 120 may receive event structures 130 from service event bus 115. In some embodiments, event subscribers 120 may register to receive events published by event publisher 105. Each event subscriber 120 may be an application, application component, application module, rules engine, etc., operating on system 100 or on another system (not shown), in some embodiments. An event subscriber 120 may be event publisher 105. When a particular event subscriber 120 receives event structure 130 from service event bus 115, the event subscriber 120 may perform callbacks to event publisher 105 to access data associated with the event. As mentioned above, the event publisher 105 may provide access to such data via a set of APIs.

While FIG. 1 shows one event publisher, it will be appreciates that system 100 may include any number of event publishers that operate in the same or similar manner as event publisher 105. In addition, FIG. 1 illustrates several event subscribers 120. System 100 may include any number of event subscribers 120 that may subscribe to one or more events from one or more event publishers 105.

Figure 2:
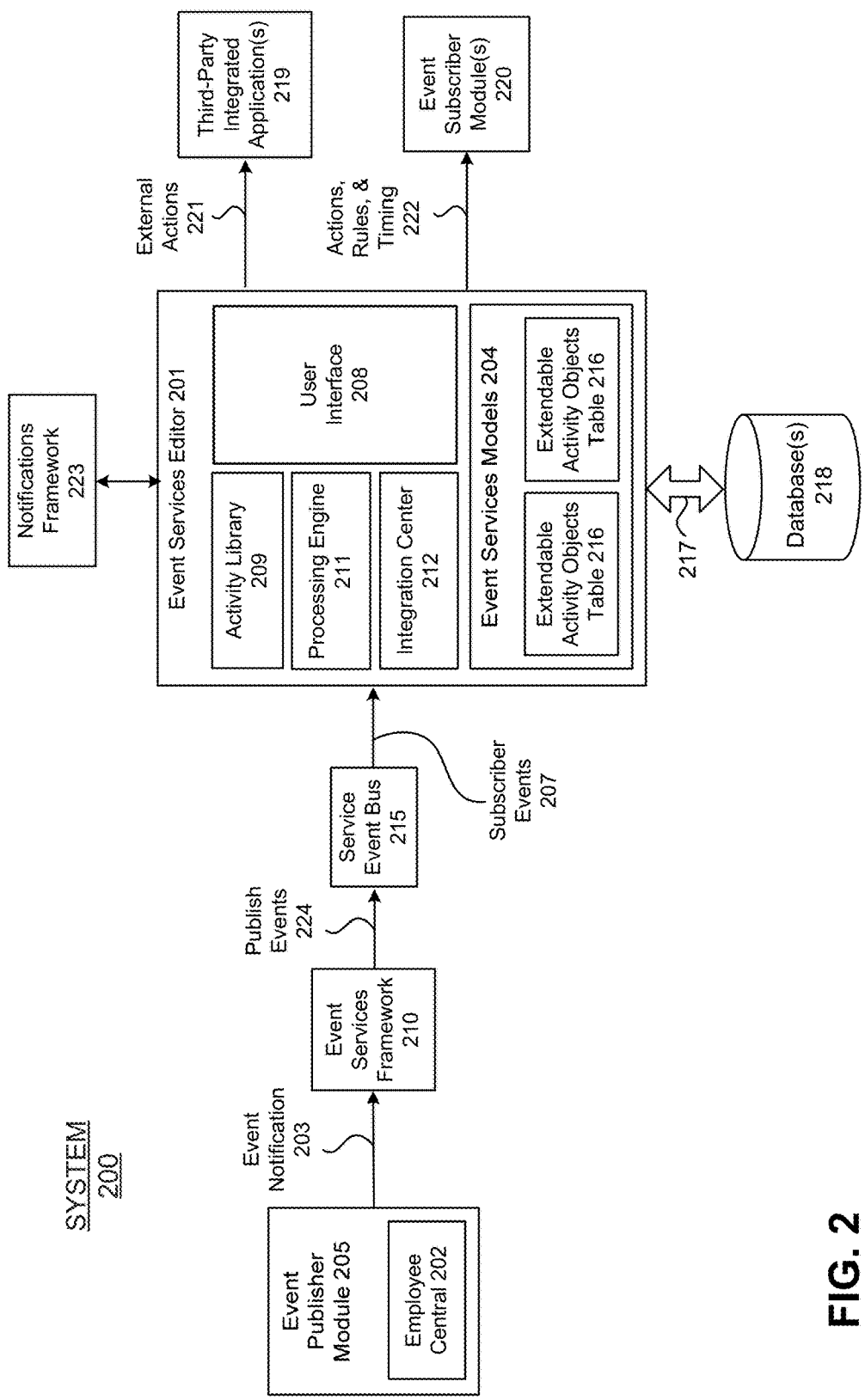
FIG. 2 depicts a conceptual block diagram of an example embodiment of a system implementing an event services modeling framework in accordance with the techniques described in this disclosure.

FIG. 2 depicts a conceptual block diagram of an example embodiment of a system implementing an event services modeling framework in accordance with the techniques described in this disclosure. In this embodiment, the event services editor 201 is instantiated between the service event bus 215 and one or more event subscriber modules 220. As shown, the event services editor 201 includes a user interface 208, an activity library 209, a processing engine 211, and integration center 212, and one or more event services models 204. The event services models 204 may include one or more extendable activity objects tables 216 (or other data structures) for storing activity objects and corresponding attributes/parameters corresponding to events configured in the event services models 204.

The event services editor 201 may be implemented as a server computer comprising at least one processor, a memory coupled with the processor for storing programmed computer code to perform operations as described in this disclosure, and a network interface for communicating over one or more networks. The event services editor 201 may also be coupled with one or more databases 218 via one or more networks and/or communication mediums 217. Databases 218 may be configured as remote databases external to the event services editor 201, in-memory databases stored in the memory of the event services editor 201, or combination thereof. In one embodiment the event services models 204 may be stored in a memory of the event services editor 201. In other embodiments, the event services models 204 may be stored in databases 218. The event services models 204 may also be stored in an in-memory database (not shown) located in the memory of the event services editor server computer 200.

In FIG. 2, system 200 further includes an event publisher module 205, an event services framework 210, a service event bus 215, and a processing engine 211 in the message path responsible for publishing events to the event services editor 201. System 200 further includes one or more event subscriber modules 220 and, optionally, one or more third-party integrated applications 219 in the message path responsible for performing actions in response to published events in the system 200.

The event publisher module 201 may comprise any of the event publishing modules and/or components described above, in this case an employee central module 202. The event publisher module 205 may be configured to communicate event notifications 203 for events that are raised within the system 200 and to provide the event notifications 203 to the event services framework 210. For example, the event publisher module 205 (employee central 202) may communicate a time-off request event notification 203 to the event services framework 210.

The event services framework 210, in at least certain embodiments, may be configured as an application programming interface ("API") or other service (e.g., a web service). The event services framework 210 may receive the event notification 203 (e.g., time-off request) for the event that was raised in the system. The event services framework 210 may then publish the events 224 to the service event bus 215 in response to the event notification 203.

In one embodiment, the service event bus 215 may be implemented as a queuing mechanism or buffer (e.g., first-in-first-out "FIFO" buffer) that is configured to take published events 203 in order and convert them into subscriber events 207 corresponding to the particular event subscriber modules 220 that have been configured for performing the actions responsive to the published events 224. On the subscriber end, the event subscriber modules 220 may be adapted to listen for subscriber event messages 207 according to the particular events they have been configured to respond to. These events and corresponding subscribers can be configured in the event services editor 201 and stored as event services models 204. In one embodiment, the service event bus 215 may be implemented as a Tibco queue, MSmq queue, etc. The service event bus 215 may be thought of as a queuing mechanism for accessing messages, which multiple subscribers 220 and/or third-party integrated applications 219 can listen for. In one embodiment, this may be a one-to-many configuration where one event publishing module 205 may correspond to multiple event subscriber modules 220 and/or third-party integrated applications 219.

The service event bus 215 may then communicate subscriber events 207 to the processing engine 211 in the event services editor 201. In one embodiment the processing engine 211 may be implemented as a business processing engine ("BPE") that is operable to listen to subscriber event messages 207 and to process the events according to the corresponding event services models 204. The processing engine 211 may call specific actions, rules, and/or timing 222 corresponding to the event subscriber modules 220 based on the configuration of the event in the event services model 200. The processing engine 211 may also call external actions 221 corresponding to the third-party integrated applications 219 based on the configuration of events in the event services models 204.

The integration center 212 may be configured to create an integration with one or more third-party applications 219. In one embodiment, this may be performed by creating a third-party integration endpoint (e.g., metadata-URL). An endpoint may be implemented as a simple URL-hosted service (where messages are received). The integration center 212 may then respond to external actions 221 that have been configured on the system in a seamless manner via the integration endpoint(s).

In one embodiment, the user interface 208 of the event services editor 201 may be adapted to display predefined event subscriber modules 220 for events, along with the subscriber module name and subscriber description. For the event services editor 201, a subscriber may be thought of as an activity (action) or a collection of related activities. The user interface 208 may also indicate when a subscription of an event will be effective based on the effective date/time 222 configured for the event in the event services models 204 for each event.

The user interface 208 may also display the actions that are going to be performed before an event, during the effective date/time of the event, and after the event. In one embodiment, the sequence of the display in the user interface 208 may be determined by the timing of the actions. Users can modify the event services model 204 configuration by removing and/or adding event subscriber modules 220 for events from a pre-defined list of events and corresponding actions in the activity library 209. Many of the subscribers (e.g., Onboarding, Recruiting, etc.) may have specific configuration settings for the subscription of events.

Finally, a notification framework 222 may be integrated with the event services editor 201 to incorporate web, push, and email notifications within system 200.

FIG. 2A depicts a conceptual diagram of an example embodiment of an extendable activity objects table 230 in accordance with the techniques described in this disclosure. Users can configure event services models 204 without ever having to write a single line of code. In the event services editor 201, event services models can be generated and modified, and the supporting data structures can be built up within the corresponding extendable activity objects tables 200. The event services models 204 can be stored as part of the event services framework in memory of the event services editor 201.

The backend system can handle the necessary structured query language ("SQL") changes and generate queries (e.g., on the fly) to make the appropriate changes to the data structures for the event services models 204. If, for example, a user configures a particular subscriber module 220 corresponding to a time-off request event, the system can access the data model for the event, query a database for data objects in the event services model 204 of the event, and automatically know what the event is, and how is it related to other events, publishers 205, and subscribers 220. Then the system can build or update the appropriate queries to modify the event services data models 204 for the time-off request event. It should be noted that query languages other than SQL are possible and the embodiments described in this disclosure are not limited to any particular query language.

In FIG. 2A, the extendable activity objects table 230 includes a set of rows 231 for standard activity objects and a set of rows 232 for customizable activity objects. The standard activity objects in the set of rows 231 may be predefined for particular activities to be performed responsive to events published within the system. The customizable activity objects in the set of rows 232 may be provided for users to create/define additional activity objects for particular activity to be performed responsive to events published within the system 200.

In addition, for each of the activity objects rows 231 and 232, a set of columns 233 for activity attributes/parameters can be provided for the activity objects in the extendable activity objects tables 230. The standard activity objects in the set of rows 231 may include a number of corresponding activity attributes and/or parameters in the set of columns 233. In addition, a number of empty columns 234 for extending the activity attributes/parameters may be provided for users to configure additional attributes and/or parameters for each of the activity objects. In this manner, embodiments may be adapted to facilitate user configuration and modeling of events and corresponding actions within the event services framework described in this disclosure.

II. Illustrative Processes

The following figures depict example flow charts illustrating various embodiments of a process for modeling event services in an event services framework in accordance with the techniques described in this disclosure. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 3:
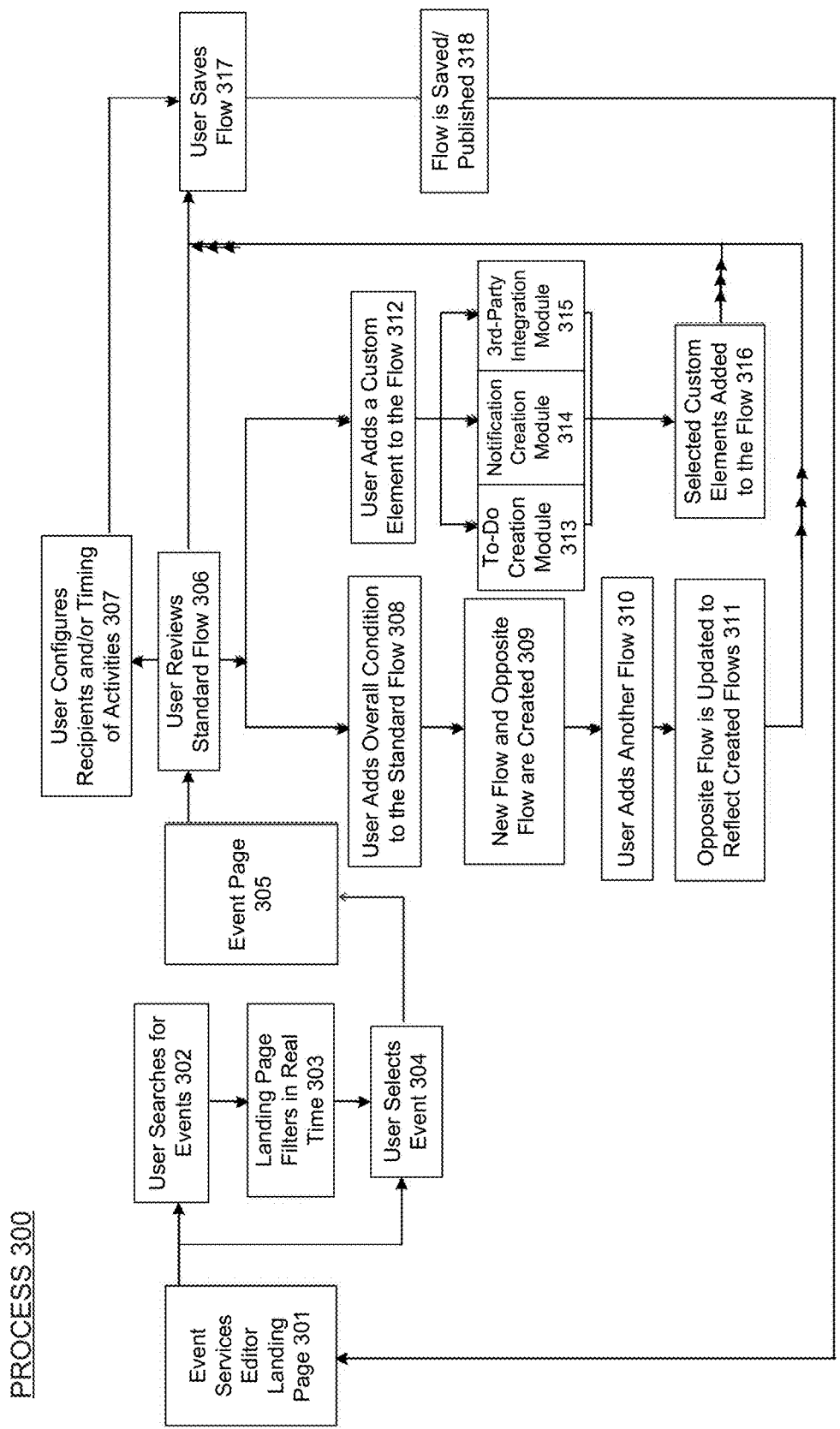
FIG. 3 depicts a conceptual flow diagram of an example embodiment of a process for modeling event services in accordance with the techniques described in this disclosure.

FIG. 3 depicts a flow diagram of an example embodiment of a process for modeling event services in accordance with the techniques described in this disclosure. In the illustrated embodiment, process 300 begins at the event services editor landing page 300. From the event services editor landing page 300, users can search for events (operation 302), the landing page can filter event in real time (operation 303), and the user can select the filtered events (operation 304).

Process 300 continues to the event page 305 from which users can review standard flows (operation 306), configure recipients and/or timing of activities (operation 307), add overall conditions to the standard flow (operation 308), and/or add custom elements to the flow (operation 312). When a user adds overall conditions to the standard flow, a new flow and the opposite of the new flow can be created (operation 309). Users can also add additional flows (operation 310). In such cases, the opposite flow can also be updated to reflect the created flows (operation 311). When the user adds a custom element to a particular flow in operation 312, the user can create a new To-Do using creation module 313, create a new notification using notification creation module 314, and/or create a third-party integration using the integration module 315. The selected custom elements can then be added to the flow (operation 316).

Process 300 continues where the user can save the generated flows (operation 317). The flows will then be saved and/or published (operation 318). The flows can then be provided back to the event services editor landing page 301 for display as well as additional modifications and editing. This completes process 300 in accordance with one example embodiment.

Figure 4A:
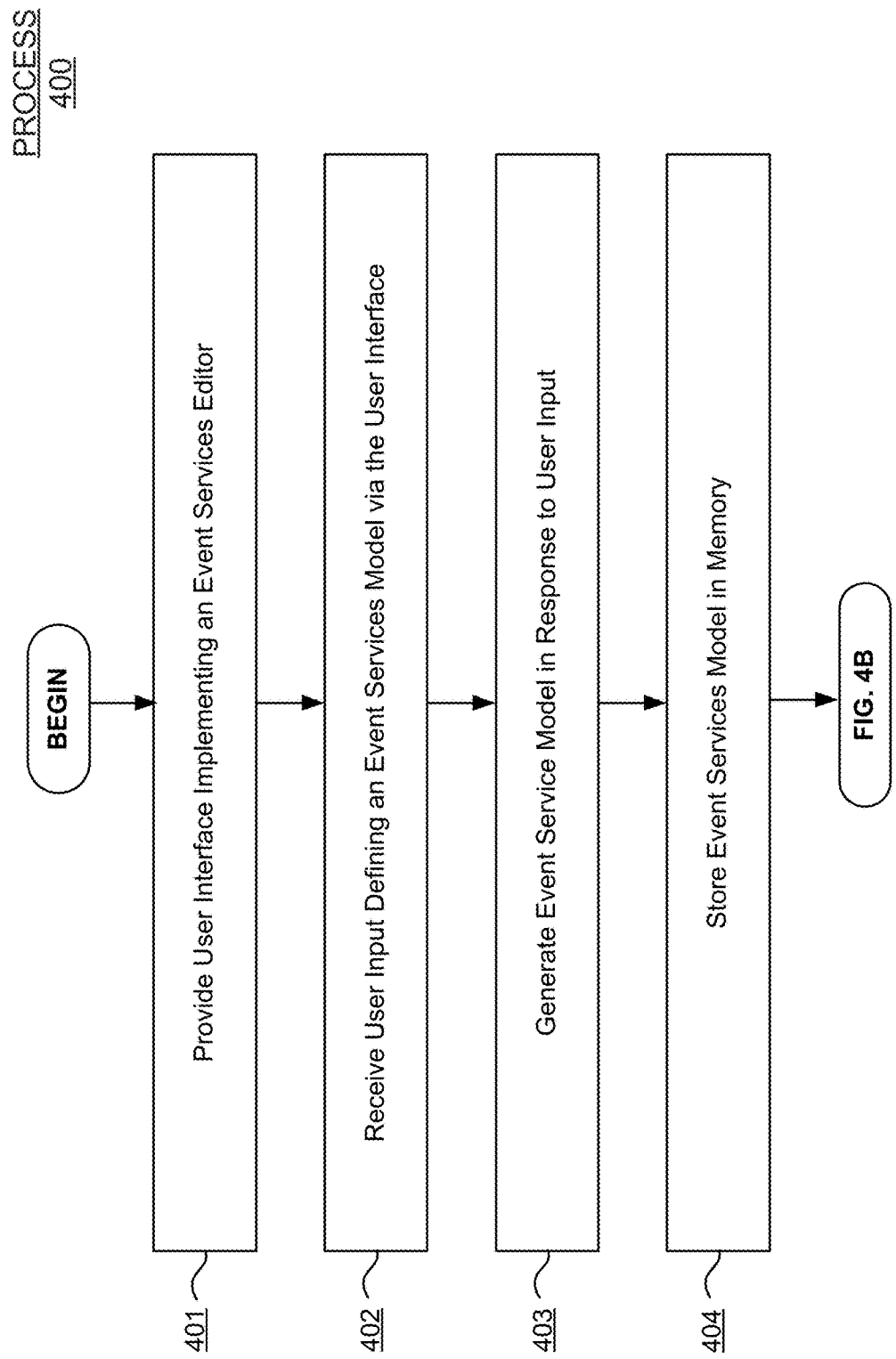

FIGS. 4A-4B depict flow charts of an example embodiment of a process for modeling event services in accordance with the techniques described in this disclosure. Process 400 can be implemented in a computer system comprising at least one processor, a memory for storing computer code executable by the processor, and a network interface for communicating over a network. In the illustrated embodiment of FIG. 4A, process 400 begins at operation 401 by providing a user interface implementing an event services modeling tool for defining event services models. In one embodiment, the event services modeling tool comprises an embodiment of the event services editor described above. The user interface may be provided to a client computer in the network. The event services models may comprise one or more event flows for events published by one or more event publishing modules in communication with the computer system.

Process 400 continues by receiving user input defining an event services model via the user interface over the network (operation 402), generating the event services model in response to the user input (operation 403), and storing the event services model in the memory of the computer system (operation 404). In one embodiment, the event services model may include (1) one or more events defined for each event flow in the event services model, (2) one or more conditions for processing the events based on a rule (condition), (3) one or more activities to be perform during processing of the events upon occurrence of the condition, (4) one or more subscriber modules defined for performing the activities during processing of the events in the event services model, and (5) a specified time for processing the events in each event flow.

Process 400 continues at FIG. 4B by receiving a published event from an event publishing module in communication with the computer system (operation 405). The system can then search for an event flow corresponding to the published event (operation 406). If the event flow is found, process 400 continues by executing the condition to determine if it is satisfied (operation 407), processing the events of the event flow when the condition is satisfied (operation 408), determining the one or more activities to be performed during processing of the events of the event flow (operation 409), and executing the one or more activities during processing of the events in the event flow (operation 410). In one embodiment, the activities to be performed during processing of the events of the event flow are configurable by users using the event services editor. The user interface may also be adapted to display a sequence of activities for the events in the event flow based on the specified time in the event services model. This completes process 400 in accordance with one example embodiment.

As described above, the events may be published to a service event bus comprising a queuing mechanism configured to convert published events into subscriber events in order. In addition, the event services model can be adapted to manage event flows across internal and third-party applications. The subscriber modules for performing the activities during processing of the events for each event flow can be adapted to listen for published event messages raised in the system. Further, the subscriber modules may be configurable by users via the user interface of the event services editor.

The event services model may include an extendable data structure for storing activity objects associated with events and attributes for the activity objects. In one embodiment, this may include the extendable activity objects table described with reference to FIG. 2A. in one embodiment, this extendable data structure may include a first set rows of activity objects comprising a first set of columns for storing attributes/parameters of the activity objects, and a second set of empty columns for users to define additional attributes/parameters for activity objects of events. The extendable data structure may also include a second set empty rows for users to define additional activity objects for events.

III. Illustrative Graphical Interface Embodiments

Figure 5:
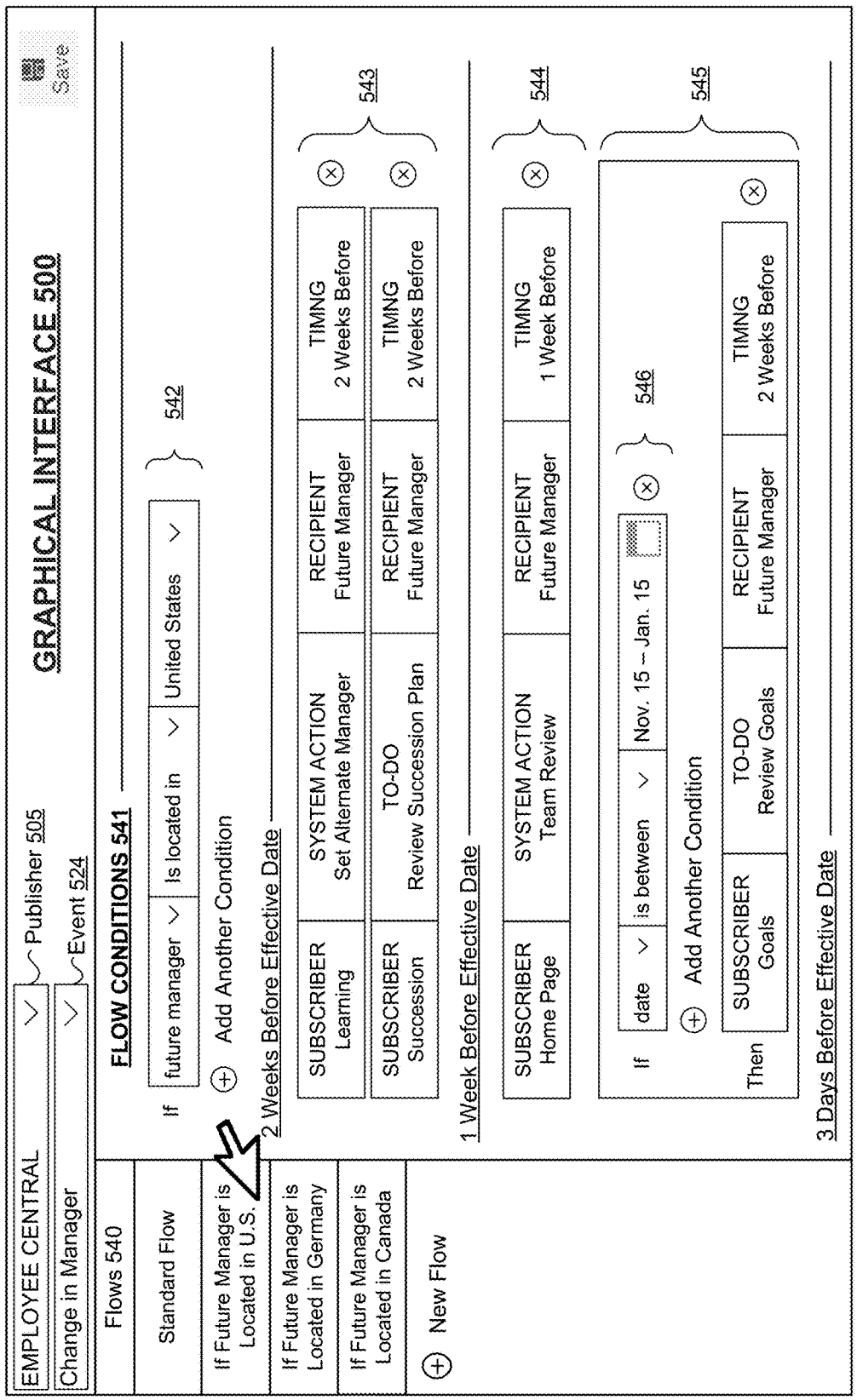
FIG. 5 depicts an example embodiment of a graphical interface for use in modeling event services in accordance with the techniques described in this disclosure.

FIG. 5 depicts an example embodiment of a graphical interface for use in modeling event services in accordance with the techniques described in this disclosure. As described above, a user may define conditions and a subsequent flow for each condition. The activities under each flow may be different. In the illustrated embodiment, graphical interface 500 displays elements, menus and controls for configuring event flows for an event services model according to embodiments of the event services framework described in this disclosure.

In one embodiment, the graphical interface 500 may be operable to display when the subscription of an event is to be effective based on the effective date/time configured for the event. The graphical interface 500 may also display the actions that are to be performed before the event, during the effective date/time of the event, as well as after the event. As shown, the sequence of the display in the graphical interface 500 can be organized by the timing of actions. In addition, users are able to modify the list of subscribers, activities (actions), recipients, and timing. In one embodiment the list of subscribers, actions, recipients, and timing can be displayed in a list in drop-down menus. In some cases, the lists of activities for an event can be obtained from predefined list of activities and actions in the activity library.

As shown in the depicted embodiment, the employee central publishing module has been selected from the publisher 505 drop-down menu and the event corresponding to the publisher has been selected from the event drop-down menu 524. In response to this, a list of flows 540 for the selected publisher and event can be displayed in the graphical interface 500. There is also an graphical element displayed in the list of flows 540 for users to add new flows for publisher 505 and event 524.

Upon selection of a flow 540 (in this case "If Future Manager is Located in the U.S."), a corresponding list of flow conditions 541 can be displayed in the graphical interface 500 that have been configured for the flow 540. In the depicted embodiment, the flow conditions, subscribers, actions, and recipients are listed in sequence of their effective timing (i.e., 2 Weeks Before, 1 Week, Before, 3 Days Before). A set of drop-down menus 542 can be displayed for selecting the flow conditions for the selected flow 540. In graphical interface 500, the set of subscribers, recipients and corresponding actions 543-545 are listed in the display in timed sequence. In addition, additional conditions 546 can be configured for each set 543-545 as shown.

Actions may include system actions, To Dos, and/or web notifications. Subscribers may include where the action occurs in the system. Recipients may include who receives the action within the organization. Multiple recipients can also be configured on the system in response to events. Timing may specify when an action occurs relative to the effective date/time. In one embodiment, the actions cluster on the graphical interface in sections of "Before Effective Date," "On Effective Date," and "After Effective Date" (in that order).

Figure 6:
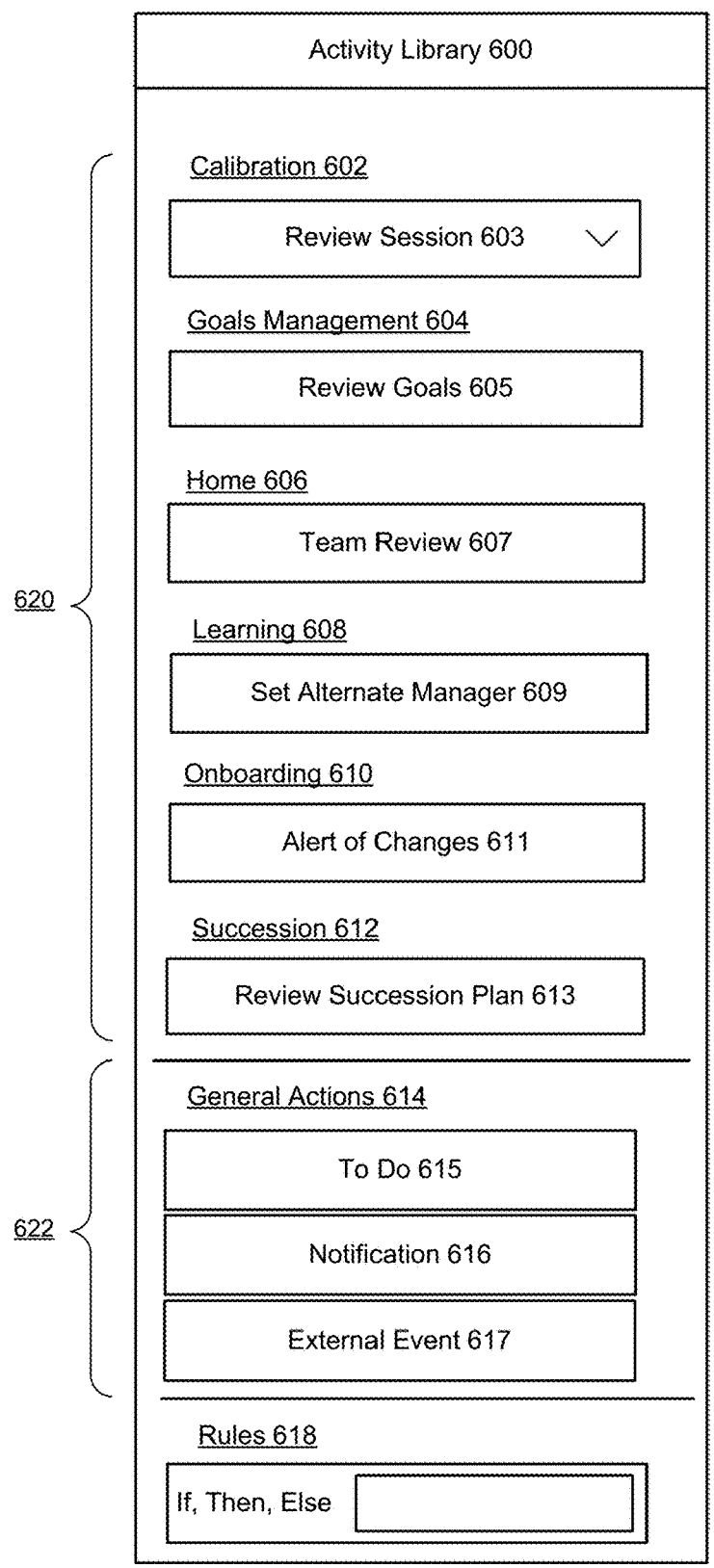
FIG. 6 depicts an example embodiment of an activity library for use in modeling event services in accordance with the techniques described in this disclosure.

FIG. 6 depicts an example embodiment of an activity library for use in modeling event services in accordance with the techniques described in this disclosure. The activity library 600 can be used for accessing lists of actions in drop-down menus that correspond to events 620 preconfigured within the system. Additional lists 622 can be displayed in the activity library 620 that have been created by users. Actions can be listed in alphabetical order in sections based on what event they belong to. Each event may have a different set of pre-defined actions in the activity library 600.

A rules section 618 can also be displayed for adding if, then, else conditions to each action. The rules section 618 may contain any rule-based operators for selection when configuring actions for events. Users can specify conditions for an activity (If/Then rule conditions). If the condition evaluates as true, then the selected subscriber can process the event and perform the corresponding actions. Users can also place an "else" condition on top of any If/Then rule condition. By default, "Then" actions do not happen if the proper conditions are not met. But if you want something else to happen in that case, the "else" condition can be used. Any number of actions can be placed in the "else" condition slot.

In the illustrated embodiment, "review session" action 603 has been selected for "calibration" event 602, "review goals" action 605 has been selected for "goals management" event 604, "team review" action 607 has been selected for "home" event 606, "set alternate manager" action 609 has been selected for "learning" event 608, "alert of changes" action 611 has been selected for "onboarding" event 610, and "review succession plan" action 613 has been selected for "succession" event 612.

In addition, To Do action 615, notification 616, and external event 617 have been selected for "general actions" events 614. Choosing a generic action may open up a separate module for creation of the action for an event. Users can save any custom actions they create so that they appear under their respective modules. The user can specify to create a To-do, notify the appropriate users affected by the event, and specify external event notification configuration for the externally publishable events.

FIG. 7A depicts an example embodiment for modeling a To Do event in accordance with the techniques described in this disclosure. In the illustrated embodiment, New To Do 701 is displayed. New To Do 701 includes text entry boxes 703 and configuration drop-down menus 704 for configuring the New To Do 701. FIG. 7A also depicts an Existing To Do 702 that has already been configured on the system.

Figure 7B:
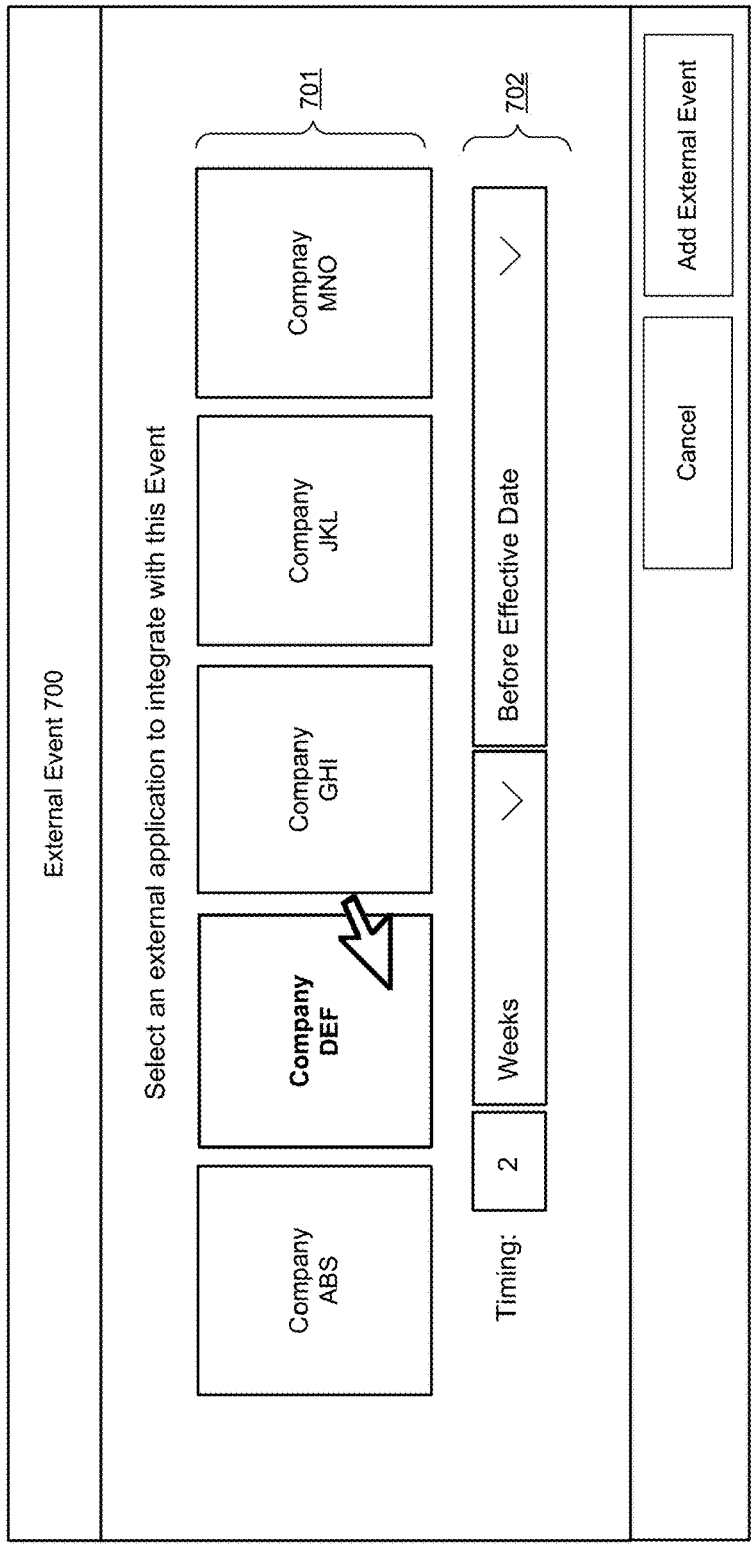
FIG. 7B depicts an example embodiment for integrating third-party applications into the event services modeling framework in accordance with the techniques described in this disclosure.

FIG. 7B depicts an example embodiment for integrating third-party applications into the event services modeling framework in accordance with the techniques described in this disclosure. In the illustrated embodiment, the external event dialog box 700 allows users to select an external third-party application to integrate with the event by selecting from display elements 701. The timing conditions corresponding to the selected external application 701 can also be configured by selecting from drop-down menus 702.

IV. Illustrative Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 8:
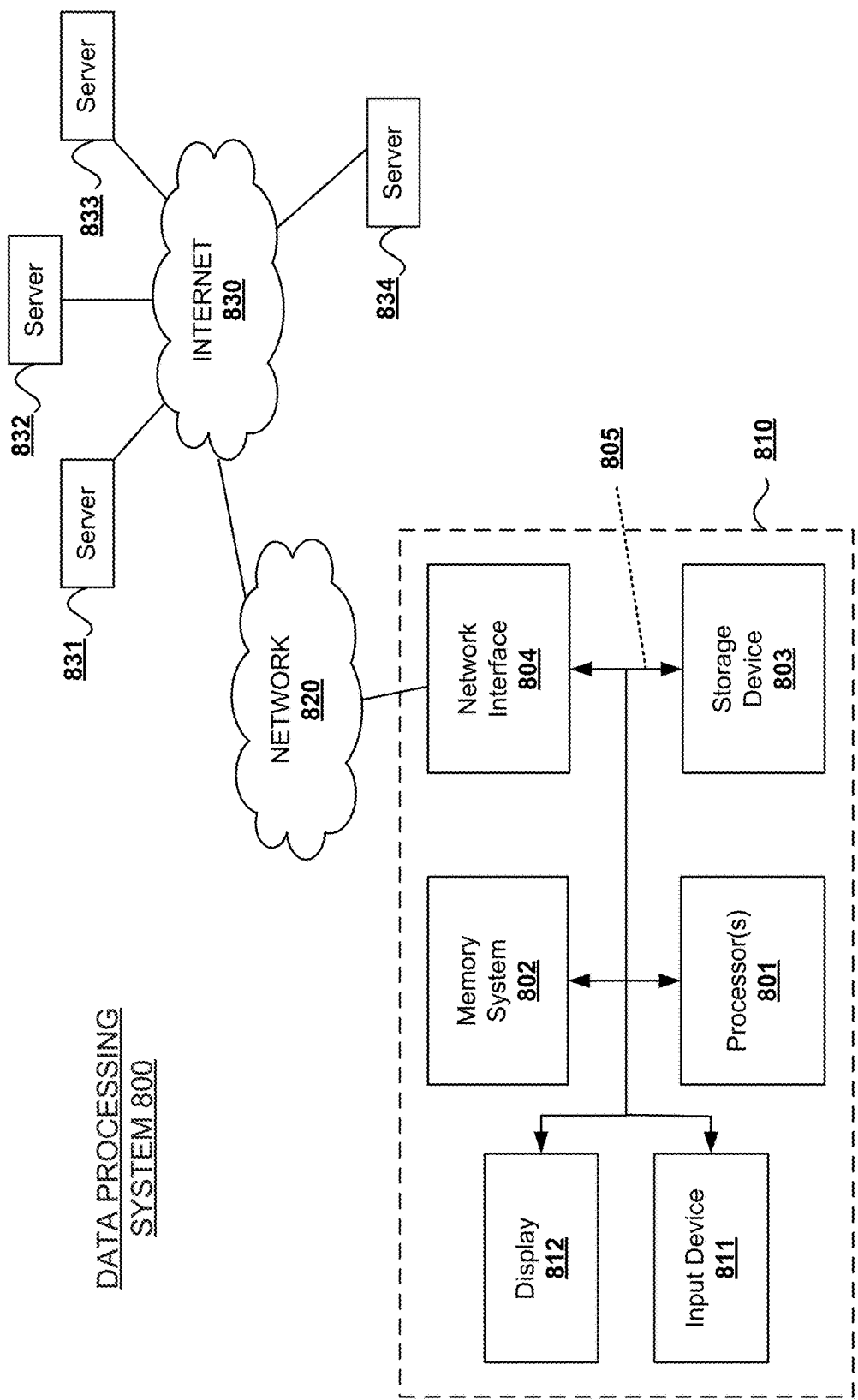
FIG. 8 depicts an example overview block diagram of a data processing system upon which the embodiments described in this disclosure may be implemented.

FIG. 8 depicts an example overview block diagram of a data processing system upon which the embodiments described in this disclosure may be implemented. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD- ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the techniques described in this disclosure. Other arrangements, embodiments, implementations and equivalents will be evident to those skilled in the art and may be employed without departing from the spirit and scope of the disclosure as defined by the following claims.

What is claimed is:

1. A method comprising:
   in a computer system comprising at least one processor, a memory for storing computer code, and a network interface for communicating over a network:
   providing, to a client computer in the network, a user interface implementing an event services modeling tool for defining event services models comprising one or more event flows for events published by one or more event publishing modules in communication with the computer system;
   receiving user input via the user interface over the network defining an event services model;
   generating the event services model in response to the user input; and
   storing the event services model in the memory of the computer system, wherein the event services model includes:
      one or more events defined for each event flow in the event services model;
      a condition for processing the events based on a rule;
      one or more activities to be performed during processing of the events upon occurrence of the condition; and
      one or more subscriber modules defined for performing the activities during processing of the events in the event services model, wherein the one or more activities are accessed utilizing a drop-down menu referencing an activity library storing pre-defined actions in alphabetical order in a first section, the activity library further comprising,
      a second section listing other actions not in alphabetical order, and
      a third section listing the rule in an if, then, else format.

2. The method of claim 1 further comprising:
   receiving a published event from an event publishing module in communication with the computer system;
   searching for an event flow corresponding to the published event;
   if the event flow is found, executing the condition to determine if it is satisfied; and
   processing the events of the event flow when the condition is satisfied.

3. The method of claim 2 further comprising:
   determining the one or more activities to be performed during processing of the events of the event flow; and
   executing the one or more activities during processing of the events in the event flow,
   wherein the activities to be performed during processing of the events of the event flow are configurable by users using the event services modeling tool.

4. The method of claim 1 wherein the event services model further comprises a specified time for processing the events in each event flow, wherein the user interface is adapted to display a sequence of activities for the events based on the specified time.

5. The method of claim 1 further comprising publishing the events to a service event bus comprising a queuing mechanism configured to convert published events into subscriber events in order.

6. The method of claim 1 wherein the event services model comprises a Business Process Model and Notation (BPMN) definition as metadata.

7. The method of claim 1 wherein the subscriber modules for performing the activities during processing of the events for each event flow are adapted to listen for published events raised in the computer system and are configurable by users via the user interface.

8. The method of claim 1 wherein the event services model comprises an extendable data structure for storing activity objects associated with events and attributes for the activity objects.

9. The method of claim 8 wherein the extendable data structure includes a first set rows of activity objects comprising a first set of columns for storing attributes of the activity objects, and a second set of empty columns for users to define additional attributes for activity objects of events.

10. The method of claim 9 wherein the extendable data structure includes a second set empty rows for users to define additional activity objects for events.

11. A computer system comprising:
    at least one processor;
    a network interface for communicating over a network; and
    a memory configured to store programmed computer code, which when executed by the processor, causes the processor to perform operations comprising:
    providing, to a client computer in the network, a user interface implementing an event services modeling tool for defining event services models comprising one or more event flows for events published by one or more event publishing modules in communication with the computer system;
    receiving user input via the user interface over the network defining an event services model;

generating the event services model in response to the user input; and storing the event services model in the memory of the computer system, wherein the event services model includes:
    one or more events defined for each event flow in the event services model;
    a condition for processing the events based on a rule;
    one or more activities to be performed during processing of the events upon occurrence of the condition; and
    one or more subscriber modules defined for performing the activities during processing of the events in the event services model, wherein the one or more activities are accessed utilizing a drop-down menu referencing an activity library storing pre-defined actions in alphabetical order in a first section, the activity library further comprising,
    a second section listing other actions not in alphabetical order, and
    a third section listing the rule in an if, then, else format.

12. The computer system of claim 11 wherein the operations further comprise:
    receiving a published event from an event publishing module in communication with the computer system;
    searching for an event flow corresponding to the published event;
    if the event flow is found, executing the condition to determine if it is satisfied; and
    processing the events of the event flow when the condition is satisfied.

13. The computer system of claim 12 wherein the activities to be performed during processing of the events of the event flow are configurable by users using the event services modeling tool.

14. The computer system of claim 11 wherein the event services model further comprises a specified time for processing the events in each event flow.

15. The computer system of claim 11 wherein the event services model comprises an extendable data structure for storing activity objects associated with events and attributes for the activity objects, the extendable data structure including a first set rows of activity objects comprising a first set of columns for storing attributes of the activity objects, and a second set of empty columns for users to define additional attributes for activity objects of events.

16. The computer system of claim 15 wherein the extendable data structure includes a second set empty rows for users to define additional activity objects for events.

17. A non-transitory computer readable storage medium storing programmed computer code, which when executed by a computer system, causes the computer system to perform operations comprising:
    providing, to a client computer in a network, a user interface implementing an event services modeling tool for defining event services models comprising one or more event flows for events published by one or more event publishing modules in communication with the computer system;
    receiving user input via the user interface over the network defining an event services model;
    generating the event services model in response to the user input; and
    storing the event services model in a memory of the computer system, wherein the event services model includes:
        one or more events defined for each event flow in the event services model;
        a condition for processing the events based on a rule;
        one or more activities to be performed during processing of the events upon occurrence of the condition; and
        one or more subscriber modules defined for performing the activities during processing of the events in the event services model, wherein the one or more activities are accessed utilizing a drop-down menu referencing an activity library storing pre-defined actions, in alphabetical order in a first section, the activity library further comprising,
        a second section listing other actions not in alphabetical order, and
        a third section listing the rule in an if, then, else format.

18. The computer readable storage medium of claim 16 wherein the operations further comprise:
    receiving a published event from an event publishing module in communication with the computer system;
    searching for an event flow corresponding to the published event;
    if the event flow is found, executing the condition to determine if it is satisfied; and
    processing the events of the event flow when the condition is satisfied.

19. The computer readable storage medium of claim 16 wherein the event services model further comprises a specified time for processing the events in each event flow, wherein the user interface is adapted to display a sequence of activities for the events based on the specified time.

20. The computer readable storage medium of claim 16 wherein the event services model comprises an extendable data structure for storing activity objects and attributes for the activity objects, the extendable data structure including a first set rows of activity objects comprising a first set of columns for storing attributes of the activity objects, and a second set of empty columns for users to define additional attributes for activity for events.

* * * * *